Figure 1:
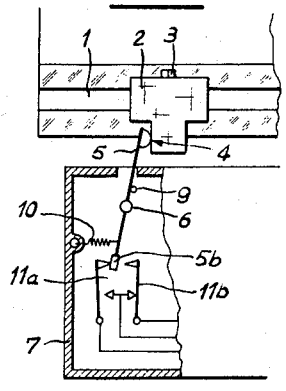

May 2, 1961 W. ENGEL 2,982,185
ARRANGEMENT FOR ADJUSTING ACCURATELY AND AUTOMATICALLY
THE POSITION OF A MEMBER SLIDING WITH
REFERENCE TO A PREDETERMINED PART
Filed March 25, 1957

United States Patent Office 2,982,185
Patented May 2, 1961

2,982,185
ARRANGEMENT FOR ADJUSTING ACCURATELY AND AUTOMATICALLY THE POSITION OF A MEMBER SLIDING WITH REFERENCE TO A PREDETERMINED PART

Willy Engel, Geneva, Switzerland, assignor to Societe Genevoise d'Instruments de Physique, Geneva, Switzerland, a firm of Switzerland Filed Mar. 25, 1957, Ser. No. 648,347
Claims priority, application Switzerland May 5, 1956
6 Claims. (Cl. 90—16)

In a machine-tool such as boring, drilling or cutting machine, it is of advantage in the machining of a series of identical parts to use a repeating system which allows positioning automatically the work-carrying slider and the tool-carrying slider in the different successive positions required for operating.

This repeating sytem which may be of various types includes in many cases one or more adjustable stops adapted to slide inside a groove longitudinally of the slider, said stops when locked in a predetermined position acting upon a shifting of the slider carrying them on a movable feeler carried by the frame so as to control the slowing down and the stopping of the motor shifting said slider.

The accuracy of adjustment of the stops longitudinally of the grooves has a direct action on the accuracy of operation of the machine so that it is highly important for said adjustment to be executed with the utmost accuracy.

To obtain such an adjustment, certain machines are provided at the end of the groove with a stationary stop serving as a starting point for the movement of the adjustable stops. By positioning a pin or gauge of a well defined length in contact with said stationary stop and by bringing the movable stop into contact with the other end of the gauge, the position of the movable stop with reference to the stationary stop is accurately defined; it is therefore necessary to use a gauge or a combination of gauges providing the desired length for each position to be assumed by the movable stop.

This drawback can be partly avoided through the use of a gauge the length of which is adjustable within a predetermined range through a micrometric screw.

Other machines incorporate a rule secured to the frame longitudinally of the slider and in parallelism with the movement of the latter, said rule carrying a series of stops distributed at uniform well defined intervals and serving as reference marks for round measures. A gauge provided with a micrometric adjustment allows when associated with such stops perfecting the adjustment by giving the decimal figure. The handling of such unvarying or adjustable gauges leads however to a loss of time and requires the possibility of an easy access which is generally not allowed.

In the case of a machine including highly accurate means, say of an optical type for measuring the shifting of the slider, it is possible to set the latter very accurately in the operative position which is to be repeated after which the movable stop is adjusted in its groove with reference to a pilot feeler.

In this latter case, the method resorted to most generally consists in hammering slightly either side of the stop until the latter is brought into the desired position in which it is finally locked by means of a screw. This manner of proceeding is hardly suitable in the case of an accurate adjustment and it may readily occur that a somewhat sudden screwing down of the screw misadjusts the stop. Furthermore an easy access to the parts is again essential.

My invention, which attempts to remove this drawback, covers an arrangement for an automatic and accurate adjustment of the position of a stop or the like member sliding with reference to a predetermined part, for instance, in the case of a machine-tool, the adjustment of the position of a movable stop with reference to a pilot feeler.

This arrangement includes, in accordance with my invention, two hammers rigid with the carrier of the pilot feeler or the like predetermined part, said hammers being capable of engaging the sliding member to either side thereof while an auxiliary mechanism is designed so as to subject said sliding member to a light hammering at a rapid rhythm through either of said hammers, according as to whether the sliding member is positioned to one or the other side of the accurate position into which it is to be brought, said hammering producing thus small intermittent movements of the sliding member in either direction until the latter actually reaches the desired position.

One of the advantages of the arrangement according to my invention resides in the possibility of obtaining automatically the desired hammering effect without it being necessary to provide for a good access to the sliding member.

Furthermore, the speed and uniformity of hammering allow accurately positioning the sliding member. In the case where the latter is constituted by a stop provided with a locking screw, the tightening of the latter may be executed gradually during the hammering, which cuts out the risk of shifting the stop through the tightening strain.

Figure 2:
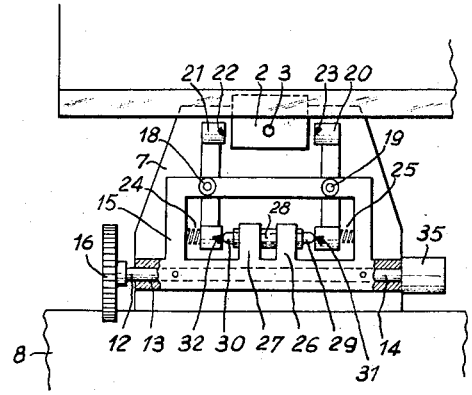
Figure 3:
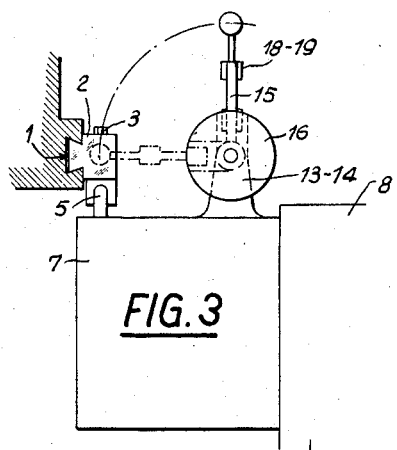
Figure 4:
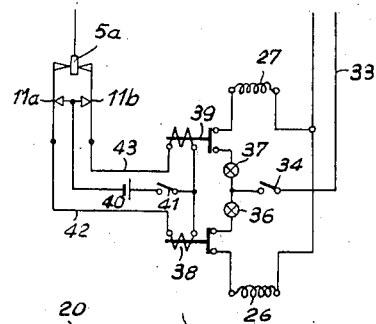
Figure 5:
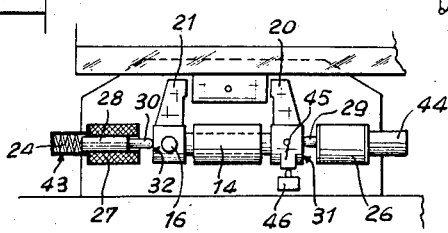

The accompanying drawing illustrates diagrammatically and by way of example a preferred embodiment of my improved arrangement together with a modification thereof. In said drawing:

Fig. 1 is a partial front view of said embodiment.
Fig. 2 is a plan view thereof.
Fig. 3 is a corresponding end view.
Fig. 4 is a wiring diagram associated with said embodiment.
Fig. 5 is a plan view of a modification.

Both arrangements illustrated are intended for the adjustment of the position of a stop on a machine-tool. 1 designates a groove formed in a slider of a machine-tool. Inside said groove is adjustably shiftable a stop 2 provided with a locking screw 3. The transverse surface 4 of the stop may engage the pilot feeler 5 which is pivotally secured to a stationary stud 6 located inside a casing 7 secured to the frame 8 of the machine-tool. The stop should be brought into a predetermined position with reference to the frame or, what is the same, with reference to the casing 7.

The feeler 5 is held in its operative position by a stop 9 and a return spring 10 housed inside the casing 7 and urging the feeler towards the stop 9 against the direction of movement of the slider. The other end 5a of the feeler acts on a highly sensitive contact-maker 11 forming part of an auxiliary control circuit, the operation of which will be described hereinafter.

The casing 7 carries two bearings 13 and 14 inside which revolves a spindle 12 to which is keyed a carrier 15. To one of the ends of the spindle 12 is keyed a knob 16, which provides for the rotation of said spindle 12 together with the support 15 whereby the latter is adapted to occupy selectively two positions, to wit a vertical inoperative position and a horizontal operative position, said positions being defined by a spring-urged pointed pin not illustrated, cooperating radially of the spindle 12 with two corresponding depressions extending at 90° with reference to each other on the spindle 12.

The carrier 15 is provided with two projections 18 and 19 extending perpendicularly to the spindle 12 and to which are secured the hammers 20 and 21 which face each other and are spaced with reference to each other by a distance such that when they are not actuated their outer ends 22 and 23 face the stop 2 to either side of the latter with a slight clearance.

The hammers 20 and 21 remain in their inoperative position as provided by the corresponding springs 24—25 engaging the carrier 15.

Two electro-magnetic windings 26 and 27 provided with a common core 28 adapted to be shifted axially are secured to the carrier 15 in a manner such that the operative ends 29 and 30 of the core lie coaxially and in registry with the inner ends 31—32 of the two hammers.

Each of the two windings 26 and 27 is inserted shuntwise in the main electric circuit 33 (Fig. 4) fed with alterating current broken at rapidly succeeding intervals. The switch 34 carried inside the casing 35 at the end of the spindle 12 which is opposed to the knob 16 is actuated through the rotation of the spindle 12 so as to close when the carrier 15 is in its horizontal operative position and to open when said carrier is in its vertical inoperative position. The two electro-magnetic windings 26—27 are energized only for the operative position of the carrier 15. The witness lamps 36 and 37 in series with said windings are ignited selectively so as to show whether the corresponding winding is operative.

The contact-breakers 38 and 39 control the feeding of the corresponding windings 26 and 27 when the switch 34 is closed. Electro-magnetic relays controlling said circuit-breakers are inserted in parallel shunt-circuits 42—43 fed through the auxiliary control circuit by a supply of pulsating current 40. A switch 41 inserted in the casing 35 fitted at the end of the spindle 12 as mentioned hereinabove is controlled simultaneously with the switch 34 so as to energize the auxiliary control circuit only when the carrier 15 is in its horizontal operative position.

The pilot feeler 5 pivoting round the stud 6 acts on the contact-maker 11 selectively at 11a and 11b according to its direction of shifting so as to open and to close the shunt-circuits 42—43 in accordance with the position occupied by said pilot valve at the moment considered.

The arrangement described operates as follows:

The pilot feeler 5 and the carrier 15 being in their inoperative positions, the contact-maker is open at 11a as shown in Fig. 1 and the contact-piece 11b closes the corresponding shunt-circuit 43 under the action of the spring-urged feeler 5 while the switches 34 and 41 are both open and the contact-makers 38 and 39 are consequently closed.

The stop 2 is now shifted leftwards and brought into contacting relationship with the feeler 5 as shown in Fig. 1 after which the carrier 15 is lowered into its horizontal operative position as provided by rotating the spindle 12 through the knob 16 so that the two hammers 20 and 21 lie now to either side of the stop 2. The rotation of the spindle 12 closes the switches 34 and 41 and this closes through the precedingly closed contact-piece 11b the shunt-circuit 43. The latter actuates the contact-breaker 39 which opens and switches off the feeding of the winding 27 and of the witness lamp 37. In contradistinction, the shunt-circuit 42 is open at 11a as a consequence of the position assumed by the feeler 5 so that the contact-breaker 38 remains closed. The lamp 36 is lit and the winding 22 is energized and acts on the core 28 which executes in quick succession a series of impacts on the hammer 20, which impacts are transmitted through the other end of the hammer onto the stop 2 so as to urge the latter gradually towards the left which causes the feeler 5 to rock slightly round its axis 6.

It may occur that under the action of the hammering impacts provided by the hammer 20, the slider 2 moves beyond the desired position; in other words, the feeler is shifted and closes the contact 11a while the contact 11b opens. Consequently, the contact-maker 38 opens, the witness-lamp 36 is extinguished while the winding 27 is energized which urges in its turn the core 28 against the hammer 21. The latter hits then the stop and urges it back towards the right hand side.

From the foregoing results a reciprocatory motion of slider or stop 2 which is alternately removed from the desired position to the left and to the right by the hammers 20 and 21. The amplitude of this motion is determined by the tightening rate of screw 3. If said screw 3 is progressively tightened, the amplitude of the motion of the stop is reduced and its successive positions converge towards the desired position which is finally reached when screw 3 is sufficiently tightened.

When the stop reaches this position, the feeler 5 does no more act upon the sensitive contact-breaker 11 while its end 5b is dimensioned so that it can occupy an intermediary position for which it does not touch contact 11a nor contact 11b. At this moment, these two contacts are closed; the lamps 36, 37 and windings 26, 27 are deenergized and the hammering stops.

The gradual tightening of the screw 3 has also for its advantage the cutting out of any possible misadjustment of the stop which misadjustment is made impossible through its locking.

In the modification illustrated in Fig. 5, the hammers 20 and 21 are keyed to a spindle sliding inside a bearing 14. Two electro-magnets 26 and 27 are secured to the casing 7, so that the operative ends 29 and 30 of their cores 28 may engage, under the action of corresponding springs 24 housed in the caps 43 and 44 rigid with the electro-magnet bodies, the lower sections 31 and 32 of the hammers to make them urge the stop along their common axis.

The hammer 21 is rigid with a hand-operable member 16 through which the operator may rock the system including the hammers 20 and 21 round its axis while the other hammer 20 is provided with a cam surface 45 acting on a push member 46 adapted to close the switches 34 and 41 when the hammers are brought into their angular operative position.

This arrangement operates in the same manner as that illustrated in Figs. 1 to 4 except for the fact that the hammers act no longer on the slider through a reciprocating pivotal movement but through a rapid rectilinear reciprocation.

In both embodiments described, the hammers are controlled through electro-magnets but they could as well be actuated hydraulically or pneumatically.

What I claim is:

1. An arrangement for automatically positioning a sliding stop along a rectilinear path with reference to a normally stationary frame, said arrangement comprising a mechanical feeler pivotally secured to said frame to rock by a small extent in a plane parallel with the path of the sliding stop to either side of a neutral position into corresponding extreme positions, the movement of the stop shifting the feeler out of its neutral position in the direction of movement of the stop towards its corresponding extreme position, a spring urging the feeler back into its neutral position, two hammers reciprocably mounted on the frame to move normally towards and away from the front and rear end respectively of said stop along the path of the latter in either direction, electromagnetic means controlling the movement of said hammers to urge them selectively into contact with the corresponding ends of the stop and to make each hammer shift slightly in its turn the stop towards the other hammer, a switch mechanically controlled by the pivotal movement of the feeler when shifted away from its neutral position, a circuit controlled by said switch and controlling the electromagnetic means to make the latter operate that hammer which urges the sliding stop in a direction returning the feeler into its neutral position.

2. An arrangement for automatically positioning a sliding stop along a rectilinear path with reference to a normally stationary frame, said arrangement comprising a mechanical feeler pivotally secured to said frame to rock by a small extent in a plane parallel with the path of the sliding stop to either side of a neutral position into corresponding extreme positions, the movement of the stop shifting the feeler out of its neutral position in the direction of movement of the stop towards its corresponding extreme position, a spring urging the feeler back into its neutral position, two hammers reciprocably mounted on the frame to move normally towards and away from the front and the rear end respectively of said stop along the path of the latter in either direction, electromagnetic means controlling the movement of said hammers to urge them selectively into contact with the corresponding ends of the stop and to make each hammer shift slightly in its turn the stop towards the other hammer, a switch mechanically controlled by the pivotal movement of the feeler when shifted away from its neutral position, a circuit controlled by said switch and controlling the electromagnetic means, to make the latter operate that hammer which urges the sliding stop in a direction returning the feeler into its neutral position, means for making the frame assume selectively an operative and an inoperative position for which the hammers are shifted away from their normal position facing the ends of the sliding stop, and a further switch controlled by the position of the frame to close said circuit for the operative position of the frame.

3. An arrangement for automatically positioning a sliding stop along a rectilinear path with reference to a normally stationary frame, said arrangement comprising a mechanical feeler pivotally secured to said frame to rock by a small extent in a plane parallel with the path of the sliding stop to either side of a neutral position into corresponding extreme positions, the movement of the stop shifting the feeler out of its neutral position in the direction of movement of the stop towards its corresponding extreme position, a spring urging the feeler back into its neutral position, two hammers reciprocably mounted on the frame to move normally towards and away from the front and the rear end respectively of said stop along the path of the latter in either direction, electromagnetic means controlling the movement of said hammers to urge them selectively into contact with the corresponding ends of the stop and to make each hammer shift slightly in its turn the stop towards the other hammer, a carrier revolvably mounted on said frame round an axis parallel with the direction of movement of the sliding stop, two hammers pivotally secured to the carrier, round pivots perpendicular to said axis and adapted to face, for a predetermined angular operative position of the carrier, the corresponding end surfaces of the sliding stop and to impinge against and shift same, electromagnets controlling respectively the two hammers, circuit sections feeding said electromagnets, two auxiliary circuit sections controlling respectively the first-mentioned circuit sections, two switches closed by the revolvable carrier in its operative position and controlling respectively the first-mentioned circuit sections and the auxiliary circuit sections, and means whereby the feeler opens selectively one of the auxiliary circuit sections when shifted away from its neutral position to make it act on the corresponding first-mentioned circuit section.

4. An arrangement for automatically positioning a sliding stop along a rectilinear path with reference to a normally stationary frame, said arrangement comprising a mechanical feeler pivotally secured to said frame to rock by a small extent in a plane parallel with the path of the sliding stop to either side of a neutral position into corresponding extreme positions, the movement of the stop shifting the feeler out of its neutral position in the direction of movement of the stop towards its corresponding extreme position, a spring urging the feeler back into its neutral position, two hammers adapted to face the two ends of the sliding stop perpendicular to the direction of movement of the latter and to impinge against and shift same, electromagnets controlling the movement of the corresponding hammers, the common operative axis of which is parallel with the direction of movement of the sliding stop, rocking means carrying the hammers and adapted to rock round the axis of the electromagnets into and out of a position for which the hammers face the sliding stop, electromagnet-feeding circuits controlled by the angular setting of the rocking means, and a control circuit controlled by the feeler when shifted out of its neutral position by the sliding stop moving out of a predetermined accurate position, said control circuit controlling the energization of that electromagnet-feeding circuit which feeds the electromagnet controlling the hammer adapted to urge the sliding stop back into its accurate position.

5. An arrangement for automatically positioning a sliding stop along a rectilinear path with reference to a normally stationary frame, said arrangement comprising a mechanical feeler pivotally secured to said frame to rock by a small extent in a plane parallel with the path of the sliding stop to either side of a neutral position into corresponding extreme positions, the movement of the stop shifting the feeler out of its neutral position in the direction of movement of the stop towards its corresponding extreme position, a spring urging the feeler back into its neutral position, two hammers pivotally mounted on said frame and facing respectively the front and the rear end of the sliding stop across the path of the latter in either direction, electromagnetic means controlling the movement of said hammers to urge them selectively into contact with the corresponding ends of the shiftable stop and to make each hammer shift slightly into its turn the shiftable stop towards the other hammer, a switch controlled by the position of the feeler when shifted away from its neutral position, a circuit controlled by said switch and controlling the electromagnetic means to make the latter operate that hammer which urges the sliding member in a direction returning the feeler into its neutral position.

6. An arrangement for automatically positioning a sliding stop along a rectilinear path with reference to a normally stationary frame, said arrangement comprising a mechanical feeler pivotally secured to said frame to rock by a small extent in a plane parallel with the path of the sliding stop to either side of a neutral position into corresponding extreme positions, the movement of the stop shifting the feeler out of its neutral position in the direction of movement of the stop towards its corresponding extreme position, a spring urging the feeler back into its neutral position, two hammers slidably mounted on said frame to move in parallelism with the path of the sliding stop and facing respectively the front end and the rear end of the sliding stop across the path of the latter in either direction, electromagnetic means controlling the movement of said hammers to urge them selectively into contact with the corresponding ends of the shiftable stop and to make each hammer shift slightly in its turn the shiftable stop towards the other hammer, a switch controlled by the position of the feeler when shifted away from its neutral position, a circuit controlled by said switch and controlling the electromagnetic means to make the latter operate that hammer which urges the sliding member in a direction returning the feeler into its neutral position.

References Cited in the file of this patent

UNITED STATES PATENTS

| | | |
|---|---|---|
| 2,779,040 | Scarff | Jan. 29, 1957 |
| 2,782,348 | Luhn | Feb. 19, 1957 |

FOREIGN PATENTS

| | | |
|---|---|---|
| 696,962 | Germany | Oct. 3, 1940 |
| 673,299 | Great Britain | June 4, 1952 |